United States Patent
Park et al.

(10) Patent No.: US 11,850,574 B2
(45) Date of Patent: *Dec. 26, 2023

(54) CATALYST FOR PREPARING A SYNTHESIS GAS, A METHOD FOR PREPARING THE SAME, AND A METHOD FOR PREPARING A SYNTHESIS GAS USING THE SAME

(71) Applicants: HYUNDAI MOTOR COMPANY, Seoul (KR); KIA CORPORATION, Seoul (KR); Research & Business Foundation SUNGKYUNKWAN UNIVERSITY, Suwon-si (KR)

(72) Inventors: Kyung Soo Park, Seoul (KR); Haeun Jeong, Uiwang-si (KR); Jin Woo Choung, Suwon-si (KR); Ji Su Yu, Suwon-si (KR); Jae Min Park, Ansan-si (KR); Jong Wook Bae, Suwon-si (KR)

(73) Assignees: HYUNDAI MOTOR COMPANY, Seoul (KR); KIA CORPORATION, Seoul (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,212

(22) Filed: Apr. 4, 2022

(65) Prior Publication Data
US 2023/0056669 A1    Feb. 23, 2023

(30) Foreign Application Priority Data
Aug. 6, 2021   (KR) .................. 10-2021-0103577

(51) Int. Cl.
*B01J 23/755* (2006.01)
*B01J 21/04* (2006.01)
(Continued)

(52) U.S. Cl.
CPC ............ *B01J 23/755* (2013.01); *B01J 21/04* (2013.01); *B01J 35/023* (2013.01);
(Continued)

(58) Field of Classification Search
None
See application file for complete search history.

(56) References Cited

FOREIGN PATENT DOCUMENTS

| KR | 20050051820 A | 6/2005 |
| KR | 20100011687 A | 2/2010 |
| KR | 20130053628 A | 5/2013 |
| KR | 20220014120 A | 2/2022 |
| KR | 20220037570 A | 3/2022 |

OTHER PUBLICATIONS

Wang et al, "Synthesis, characterization and catalytic performance of MgO-coated Ni-SBA-15 catalysts for methane dry reforming to syngas and hydrogen," International Journal of Hydrogen Energy 38, pp. 9718-9731 (Year: 2013).*
(Continued)

*Primary Examiner* — Colin W. Slifka
(74) *Attorney, Agent, or Firm* — LEMPIA SUMMERFIELD KATZ LLC

(57) ABSTRACT

A catalyst for preparing a synthesis gas includes: a mesoporous $Al_2O_3$ support including mesopores having a pore size of about 1 nm to about 30 nm; metal nanoparticles supported in the mesopores of the mesoporous $Al_2O_3$ support wherein the metal nanoparticles have a particle size of less than or equal to about 20 nm; and a metal oxide coating layer including particles wherein the metal oxide coating layer is coated on the surface of the mesoporous $Al_2O_3$ support and includes mesopores having a pore size of about 2 nm to about 50 nm.

19 Claims, 6 Drawing Sheets

(51) Int. Cl.
*B01J 37/04* (2006.01)
*B01J 37/02* (2006.01)
*B01J 37/08* (2006.01)
*B01J 35/10* (2006.01)
*B01J 35/02* (2006.01)
*C01B 3/40* (2006.01)
*C01B 32/40* (2017.01)

(52) U.S. Cl.
CPC ....... *B01J 35/1057* (2013.01); *B01J 35/1061* (2013.01); *B01J 37/0225* (2013.01); *B01J 37/04* (2013.01); *B01J 37/08* (2013.01); *C01B 3/40* (2013.01); *C01B 32/40* (2017.08); *C01B 2203/0233* (2013.01); *C01B 2203/1241* (2013.01)

(56) References Cited

OTHER PUBLICATIONS

Tsoukalou, Athanasia, et al. "Dry-reforming of methane over bimetallic Ni—M/La2O3 (M=Co, Fe): the effect of the rate of La2O2CO3 formation and phase stability on the catalytic activity and stability." Journal of Catalysis 343 (2016): 208-214.

Yuan, Quan, et al. "Facile synthesis for ordered mesoporous γ-aluminas with high thermal stability." Journal of the American Chemical Society 130.11 (2008): 3465-3472.

\* cited by examiner

Comparative Example 3 : Ni(10)/Al$_2$O$_3$

Example 7 : Ni(12)/m-Al@$Al_2O_3$

CATALYST FOR PREPARING A SYNTHESIS GAS, A METHOD FOR PREPARING THE SAME, AND A METHOD FOR PREPARING A SYNTHESIS GAS USING THE SAME

CROSS-REFERENCE TO RELATED APPLICATION

This application claims priority to and the benefit of Korean Patent Application No. 10-2021-0103577, filed in the Korean Intellectual Property Office on Aug. 6, 2021, the entire contents of which are incorporated herein by reference.

BACKGROUND

(a) Field

The present disclosure relates to a catalyst for preparing a synthesis gas, a method for preparing the same, and a method for preparing a synthesis gas using the same, which can improve aggregation of active particles and coke formation, and maintain activity.

(b) Description of the Related Art

The statements in this section merely provide background information related to the present disclosure and may not constitute prior art.

A global temperature rises due to greenhouse gases such as carbon dioxide ($CO_2$) has resulted in sea level rise, natural disasters, ecosystem changes, and the like. In order to reduce emission of the carbon dioxide, humankind has developed technologies such as CCS (Carbon Capture and Storage) and CCU (Carbon Capture and Utilization), which have not solved this essential problem of conventional carbon dioxide emissions.

Most of the carbon dioxide emissions are mainly caused by production of energy and materials necessary for human life, such as electricity, transportation, industry, housing, and the like. Regulations for reducing the $CO_2$ emissions such as the emission reduction target according to the Paris Climate Agreement, an increase in the price of carbon credits, the EU Green Deal policy for achieving zero net carbon emission, the European Renewable Energy Directive 2 (RED2) regulation on the inclusion of $CO_2$ in the fuel-manufacturing process, and the like are world-widely being strengthened.

As one of the methods for reducing $CO_2$, hydrogen is being spotlighted as a clean energy carrier of the future instead of energy that causes environmental pollution such as a fossil fuel, nuclear power, or the like. The hydrogen may be used in plant power generation, a fuel cell for transportation, and the like. Currently, steam-reforming (refer to Reaction Scheme 1) is commercially available as a method of producing the hydrogen, but when 1 kg of the hydrogen is produced, about 8 kg or more of carbon dioxide is emitted, and so, when dry reforming (refer to Reaction Scheme 2) is adopted as an alternative method to produce the hydrogen, the carbon dioxide emission may be greatly reduced.

However, the dry reforming causes severe deposition of carbon in a catalyst due to compositional characteristics of reaction gas and thus inactivation of the catalyst, making it difficult to commercialize. In addition, since synthesis gas is generated at a ratio of $H_2/CO=1$, it is impossible to conduct a Fisher-Tropsch reaction requiring $H_2/CO>1$ and synthesize an oxygen-containing compound, etc.

In order to improve this, combined reforming (refer to Reaction Scheme 3) in which steam is added to the dry reforming is proposed. The combined reforming may produce more hydrogen than the dry reforming as well as consume carbon dioxide and in addition, may be applied to a subsequent process requiring $H_2/CO>1$. In the transportation field, the hydrogen may be used as a raw material for manufacturing DME (dimethyl ether) as an alternative synthesis fuel to gasoline and diesel. Low-carbon synthesis fuels may be used instead of the currently-used fuels to reduce several Gtons of $CO_2$ per year.

[Reaction Scheme 1] Steam reforming of methane $$CH_4+H_2O \rightarrow 3H_2+CO$$

[Reaction Scheme 2] Dry reforming of methane $$CH_4+CO_2 \rightarrow 2H_2+2CO$$

[Reaction Scheme 3] Combined steam and carbon dioxide reforming of methane $$3CH_4+CO_2+2H_2O \rightarrow 4CO+8H_2$$

[Reaction Scheme 4] Methane decomposition $$CH_4 \rightarrow C(s)+2H_2$$

[Reaction Scheme 5] Boudouard reaction $$2CO \leftrightarrow C(s)+CO_2$$

[Reaction Scheme 6] Coke steam gasification $$C(s)+H_2O \rightarrow H_2+CO$$

The reforming reaction goes through Reaction Schemes 4 to 6, and in particular, when the reverse reaction of Reaction Scheme 5 and the coke steam gasification reaction of Reaction Scheme 6 are not actively performed, carbon may be deposited and grow in active sites of a catalyst and thus structurally collapse an active material and cause inactivation of the catalyst.

Accordingly, in order to simultaneously convert thermodynamically stable methane and carbon dioxide, a catalyst having heat resistance applicable at a high temperature (about 700° C. to about 1200° C.) that the carbon deposition is minimized and ensuring high conversion efficiency is required.

As a catalyst for a methane reforming reaction for preparing synthesis gas, a nickel-based catalyst is widely used due to relatively high activity but has a severe problem in durability due to rapid deposition of carbon and aggregation of nickel. In contrast, when platinum or rhodium, a noble metal, is as an active metal, the catalyst inactivation is significantly slowed, but it is still economically difficult to use in a commercial process that requires a large amount of catalyst.

The nickel-based catalyst is generally used by dispersing nickel particles in a support such as $SiO_2$, $Al_2O_3$, $MgAl_2O_4$, $La_2O_3$, $CeO_2$, $ZrO_2$, and the like. In order to solve the catalyst stability problem according to the carbon deposition for the reforming reaction, studies have been reported in which catalyst activity is maintained by adding a small amount of various alkali and rare earth element components (Na, K, La, Mg, Ce, Y, and the like) or other transition metal components (Co, Fe, Cu, and the like) as an enhancer thereto.

However, a catalyst prepared in this method, like a general supported catalyst, has accompanied with activity deterioration and the carbon deposition according to high-temperature aggregation of the surface-dispersed nickel nanoparticles, and for the reaction stability, an alkali enhancer such as calcium need to be inevitably added thereto.

SUMMARY

The present disclosure provides a catalyst for preparing a synthesis gas capable of preventing oxidation and high-temperature aggregation by reactants during the reaction of active particles to maintain reaction active sites, enhancing hydrothermal stability of the catalyst to have excellent long-term durability, and maintaining stable and high-efficiency conversion activity without addition of noble metals or additional enhancers.

Another embodiment of the present disclosure provides a method for preparing the catalyst for preparing a synthesis gas.

Another embodiment of the present disclosure provides a method of preparing a synthesis gas using the catalyst for preparing a synthesis gas.

According to an embodiment, a catalyst for preparing a synthesis gas includes a mesoporous $Al_2O_3$ support including mesopores having a pore size of about 1 nm to about 30 nm; metal nanoparticles supported in the mesopores of the mesoporous $Al_2O_3$ support wherein the metal nanoparticles have a particle size of less than or equal to about 20 nm; and a metal oxide coating layer including particles wherein the metal oxide coating layer is coated on the surface of the mesoporous $Al_2O_3$ support and includes mesopores having a pore size of about 2 nm to about 50 nm.

The pore size of the mesoporous $Al_2O_3$ support may be about 6 nm to about 20 nm.

The metal nanoparticles may include Ni, Fe, Cu, Co, Mo, Ru, Rh, Pd, Ag, Cd, Zn, Au, Pt, Ir, Os, W, an oxide thereof, or a combination thereof.

The particle size of the metal nanoparticles may be about 1 nm to about 6 nm.

The metal nanoparticles may be included in an amount of about 5 wt % to about 30 wt % based on the total weight of the catalyst.

The metal oxide coating layer may include $SiO_2$, $Al_2O_3$, MgO, $MgAl_2O_4$, $La_2O_3$, $CeO_2$, $ZrO_2$, SiC, indium tin oxide (ITO), fluorine-doped tin oxide (FTO), or a combination thereof.

The metal nanoparticles may be disposed in an amount of about 10 wt % to about 90 wt % based on the total weight of the metal nanoparticles in the mesopores of the mesoporous $Al_2O_3$ support.

The metal oxide coating layer may be included in an amount of about 0.5 wt % to about 10 wt % based on the total weight of the catalyst.

According to another embodiment, a method of preparing a catalyst for preparing a synthesis gas includes preparing a mesoporous $Al_2O_3$ support including mesopores having a pore size of about 1 nm to about 30 nm; supporting metal nanoparticles having a particle size of less than or equal to about 20 nm in the mesopores of the mesoporous $Al_2O_3$ support; and forming a metal oxide coating layer including mesopores having a pore size of about 2 nm to about 50 nm on the surface of the mesoporous $Al_2O_3$ support.

The supporting of the metal nanoparticles may be performed by applying a metal nanoparticle precursor solution to the mesoporous $Al_2O_3$ support and then sintering the same at about 400° C. to about 1000° C. for about 1 hour to about 6 hours.

The forming of the metal oxide coating layer may be performed by attaching a nonionic, cationic, or anionic surfactant to the surface of the mesoporous $Al_2O_3$ support on which the metal nanoparticles are supported, applying the metal oxide precursor solution, and sintering the same at about 400° C. to about 1000° C. for about 1 hour to about 6 hours to form the metal oxide coating layer including mesopores having a pore size of about 2 nm to about 50 nm.

The metal nanoparticles may be disposed in an amount of about 10 wt % to about 90 wt % based on the total weight of the metal nanoparticles in the mesopores of the mesoporous $Al_2O_3$ support.

According to another embodiment, a method of preparing a synthesis gas includes performing a combined reforming reaction by injecting a reaction gas including water ($H_2O$) in the presence of the catalyst for preparing a synthesis gas according to an embodiment and heat-treating the same.

The reaction gas may include water, and C1 to C20 alkane, C1 to C20 alkene, C1 to C20 alkyne, carbon dioxide, ammonia, $HCO_2H$, $CH_3OH$, or a combination thereof.

The reaction gas may include methane, and carbon dioxide and water as oxidizing agents, and the synthesis gas may include hydrogen and carbon monoxide.

The reaction gas may include methane and oxidizing agents (carbon dioxide and water) in a mole ratio of about 1:1 to about 1:3.

The oxidizing agents may include carbon dioxide and water in a mole ratio of about 0.2:1.5 to about 1.2:0.2.

The combined reforming reaction may be performed at a temperature of about 600° C. to about 1000° C.

The reaction gas may be supplied at a space velocity of about 30 $L/g_{cat}\cdot h$ to about 1800 $L/g_{cat}\cdot h$.

The catalyst for preparing a synthesis gas of the present disclosure may prevent oxidation and high-temperature aggregation by reactants during the reaction of active particles to maintain reaction active sites, have excellent long-term durability by enhancing hydrothermal stability of the catalyst, and maintain a stable and high-efficiency conversion activity without adding noble metals or additional enhancers.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The advantages and features of the present disclosure and the methods for accomplishing the same should be apparent from the embodiments described hereinafter with reference to the accompanying drawings. However, the embodiments should not be construed as being limited to the embodiments set forth herein. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined.

In addition, unless explicitly described to the contrary, the word "comprise," and variations such as "comprises" or "comprising," should be understood to imply the inclusion of stated elements but not the exclusion of any other elements.

Further, the singular includes the plural unless mentioned otherwise.

Figure 1:
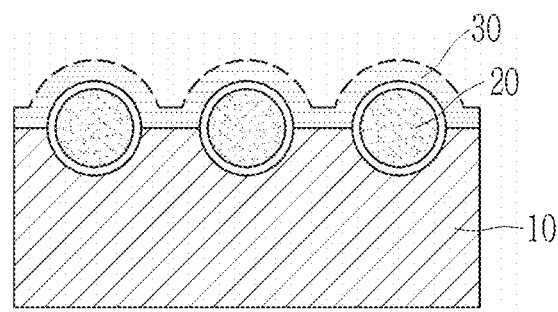
FIG. 1 is a schematic view showing a catalyst for preparing a synthesis gas according to an embodiment.

FIG. 1 is a schematic view showing a catalyst for preparing a synthesis gas according to an embodiment. Hereinafter, referring to FIG. 1, a catalyst for preparing a synthesis gas according to an embodiment is described.

A catalyst for preparing a synthesis gas according to an embodiment includes a mesoporous $Al_2O_3$ support 10 including mesopores, metal nanoparticles 20 supported in mesopores of the mesoporous $Al_2O_3$ support 10, and a metal oxide coating layer 30 coated on a surface of the mesoporous $Al_2O_3$ support 10.

The mesoporous $Al_2O_3$ support 10 includes a mesoporous structure including mesopores.

The mesopores of the mesoporous structure may have a pore size of about 1 nm to about 30 nm, for example, about 5 nm to about 20 nm, or about 6 nm to about 20 nm. The mesoporous structure provides a stable structure to the catalyst while highly dispersing the metal nanoparticles 20 as the active material. If the pore size of the mesopores of the mesoporous structure is too large, structural stability of the catalyst may be deteriorated, while if the pore size of the mesopores is too small, the metal nanoparticles 20 as the active material may not be well supported in the mesopores of the mesoporous structure.

As the mesoporous structure has mesopores, it may have a high specific surface area, and thus a large amount of metal nanoparticles 20 as an active material may be supported thereon and supply of reaction gas to the supported metal nanoparticles 20 and diffusion of product and by-product from the metal nanoparticles 20 may be facilitated.

Accordingly, the mesoporous structure may have a specific surface area of greater than or equal to about 100 $m^2/g$, for example about 100 $m^2/g$ to about 800 $m^2/g$. When the specific surface area of the mesoporous structure is less than about 100 $m^2/g$, the amount of the metal nanoparticles 20 that can be supported on the mesoporous structure may be limited.

The mesoporous structure may have a pore volume greater than about 0.5 $cm^3/g$, for example about 0.5 $cm^3/g$ to about 2.0 $cm^3/g$. When the pore volume of the mesoporous structure is less than or equal to about 0.5 $cm^3/g$, it is difficult to support the metal nanoparticles 20 inside the mesopores, so that the dispersibility thereof may be lowered.

The mesoporous structure may include poly(ethylene oxide)-poly(propylene oxide)-poly(ethylene oxide) (Pluronic P123), polyethylene oxide, PEO), polypropylene oxide (PPO), $SiO_2$, $Al_2O_4$, MgO, $MgAl_2O_4$, $La_2O_3$, $CeO_2$, $ZrO_2$, SiC, indium tin oxide (ITO), fluorine-doped tin oxide (FTO), or a combination thereof, and may include $Al_2O_3$ as an example.

The metal nanoparticles 20 as an active material are supported on pores and/or surfaces of the mesoporous $Al_2O_3$ support 10.

The metal nanoparticles 20 may include Ni, Fe, Cu, Co, Mo, Ru, Rh, Pd, Ag, Cd, Zn, Au, Pt, Ir, Os, W, an oxide thereof, or a combination thereof. An appropriate combination of these may improve carbon deposition, but economic feasibility may be reduced when a noble metal series is used.

A particle size of the metal nanoparticles 20 may be less than or equal to about 20 nm, for example, less than or equal to about 10 nm, less than or equal to about 6 nm, or about 1 nm to about 6 nm. As the particle size of the metal nanoparticles 20 is smaller, probability that they can be disposed inside the mesopores of the mesoporous $Al_2O_3$ support 10 may be higher, and a growth of particles during the reaction may be prevented. When it exceeds about 10 nm, growth probability may be increased after carbon deposition.

For example, the particle size of the metal nanoparticles 20 may be smaller than the pore size of the mesopores of the mesoporous $Al_2O_3$ support 10. Accordingly, the metal nanoparticles 20 may be more possibly disposed inside the mesopores of the mesoporous $Al_2O_3$ support 10 and thus prevented from oxidation and high-temperature aggregation by reactants during the reaction of the active particles, maintaining reaction active sites. As such, the metal nanoparticles 20 achieves excellent long-term durability by enhancing hydrothermal stability of the catalyst, and maintains stable and high-efficiency conversion activity without adding noble metals or additional enhancers.

In one embodiment, about 10 wt % to about 90 wt %, for example, about 20 wt % to about 80 wt % of the metal nanoparticles 20 based on the total weight of the metal nanoparticles 20 may be disposed inside the mesopore of the mesoporous $Al_2O_3$ support 10. The amount of the metal nanoparticles 20 disposed inside the mesopores of the mesoporous $Al_2O_3$ support 10 may be measured through a transmission electron microscope analysis by using statistical techniques. In one form, the metal nanoparticles 20 disposed inside the mesopores of the mesoporous $Al_2O_3$ support 10 may cover a case that some of the metal nanoparticles 20. For example, about 90 volume %, about 80 volume %, about 70 volume %, about 60 volume %, about 50 volume %, about 40 volume %, about 30 volume %, about 20 volume %, or about 10 volume % of the metal nanoparticles 20 are disposed inside the mesopores of the mesoporous $Al_2O_3$ support 10 as well as a case that all the metal nanoparticles 20 are disposed inside the mesopores of the $Al_2O_3$ support 10. When less than about 10 wt % of the metal nanoparticles 20 are disposed inside the mesopores of the mesoporous $Al_2O_3$ support 10, particles exposed to the outside of the support are aggregated and oxidized, inactivating the catalyst, and when greater than about 90 wt % of the metal nanoparticles 20 are disposed inside the mesopores of the mesoporous $Al_2O_3$ support 10, the pores of the support may collapse due to the aggregation of the particles inside the pores in a high-temperature reaction environment and thus exacerbate the aggregation of the particles.

The metal nanoparticles 20 may be included in an amount of about 5 wt % to about 30 wt %, for example, about 10 wt % to about 20 wt % based on the total weight of the catalyst. When the metal nanoparticles 20 are included in an amount of less than about 5 wt %, carbon dioxide and methane conversion rates may be low, and when the metal nanoparticles 20 are included in an amount of greater than about 30 wt %, the carbon deposition may bring about a coke formation reaction and particle aggregation, deteriorating performance and life-span of a catalyst.

Herein, the metal nanoparticles 20 may include oxide forms of at least some of the metal nanoparticles 20. When a precursor of the metal nanoparticles 20 is impregnated in the mesoporous $Al_2O_3$ support 10 and then, dried and sintered to prepare a catalyst, the metal nanoparticles 20 may be partially reduced and oxidized, generating the oxide forms of the metal nanoparticles 20 in addition to the metal nanoparticles 20 on the catalyst surface.

The metal oxide coating layer 30 may be disposed on the surface of the mesoporous $Al_2O_3$ support 10. The metal oxide coating layer 30 may prevent aggregation and growth of the metal nanoparticles 20 during the synthesis gas-generation reaction due to a space entrapment effect between the mesoporous $Al_2O_3$ support 10 and the metal oxide coating layer 30.

The metal oxide coating layer 30 may include $SiO_2$, $Al_2O_3$, MgO, $MgAl_2O_4$, $La_2O_3$, $CeO_2$, $ZrO_2$, SiC, indium tin oxide (ITO), fluorine-doped tin oxide (FTO), or a combination thereof, and may include, for example $SiO_2$ or $Al_2O_3$.

The metal oxide coating layer 30 may be included in an amount of about 0.5 wt % to about 10 wt %, for example about 1 wt % to about 8 wt %, or about 1 wt % to about 5 wt % based on the total weight of the catalyst. When the content of the metal oxide coating layer 30 is less than about 0.5 wt %, it is difficult to obtain the effect of the coating, so the aggregation of the metal nanoparticles 20 may increase, while when it exceeds about 10 wt %, the content of the metal nanoparticles 20 is decreased, and a structural stability of the metal oxide coating layer 30 against steam may be weakened, so that aggregation of the metal nanoparticles 20 may increase.

In the catalyst for preparing a synthesis gas, the metal nanoparticles 20, which are active materials, are structurally well supported on the mesoporous support 10, and the aggregation between particles is reduced by the metal oxide coating layer 30 to have durability against carbon deposition.

A method of preparing a catalyst for preparing a synthesis gas according to another embodiment includes preparing a mesoporous $Al_2O_3$ support including mesopores, supporting metal nanoparticles on the mesoporous $Al_2O_3$ support, and forming a metal oxide coating layer on the surface of the mesoporous $Al_2O_3$ support.

The mesoporous $Al_2O_3$ support may be prepared using a variety of methods. For example, it may be synthesized by dissolving Pluronic P123 in an aqueous solution and using it as an organic template material, performing hydrolysis and condensation reaction of a $SiO_2$ precursor or an $Al_2O_3$ precursor using an acid catalyst, followed by hydrothermal synthesis. Through this method, a mesoporous $Al_2O_3$ support having a pore size of about 1 nm to about 30 nm, for example about 5 nm to about 20 nm, or about 6 nm to about 20 nm of the mesopores may be prepared.

The supporting of the metal nanoparticles may be performed by applying a metal nanoparticle precursor solution to the mesoporous $Al_2O_3$ support and then sintering the same at about 400° C. to about 1000° C. for about 1 hour to about 6 hours.

In one embodiment, the metal nanoparticle precursor solution may be prepared by adding the metal nanoparticle precursor to a solvent. The metal nanoparticle precursor may include a nitrate, a sulfate, an acetate, a chloride, an oxide, an acetylacetonate, or a combination thereof of the metal nanoparticles. The solvent may include distilled water, ethanol, methanol, ethylene glycol, propylene glycol, isopropylalcohol, or a combination thereof.

The drying may be performed at about 60° C. to about 90° C. When the drying is performed at less than about 60° C., since the solvent is not all removed, the metal nanoparticles may leak out of the mesopores during the sintering, but when the drying is performed at greater than about 90° C., the drying rate is fast, so that the metal nanoparticles also may leak out of the mesopores during the drying.

The sintering may be performed at about 400° C. to about 1000° C. for about 1 hour to about 6 hours. When the sintering is performed at less than about 400° C. or for less than about 1 hour, the precursor solution may not be converted into nickel particles, but when the sintering is performed at greater than about 1000° C. or for greater than about 6 hours, the nickel particles may be formed to be excessively large, reducing a specific surface area of a catalyst.

Through this method, the metal nanoparticles may have a particle size of less than or equal to about 20 nm, for example, less than or equal to about 10 nm, less than or equal to about 6 nm, or about 1 nm to about 6 nm. In addition, about 10 wt % to about 90 wt %, for example, about 20 wt % to about 80 wt % of the metal nanoparticles based on the total weight of the metal nanoparticles may be disposed inside the mesopores of the mesoporous $Al_2O_3$ support.

In another embodiment, the oxides of the metal nanoparticles may be produced during preparation of a catalyst. For example, when a catalyst for preparing a synthesis gas is prepared by bonding the metal nanoparticles to a support and then, drying them and then, forming a metal oxide coating layer and sintering it, since the metal nanoparticles may be partially reduced and oxidized, the oxides of the metal nanoparticles in addition to the metal nanoparticles may be included on the surface of the support.

The metal oxide coating layer may be formed by mixing a metal nanoparticle-supporting support and a metal oxide precursor and sintering the mixture.

For example, the metal nanoparticle-supporting support is dispersed in a solvent, a surfactant (e.g., cetyltrimethylammonium bromide (CTAB)) is added thereto and then, ultrasonicated, so that the surfactant may be adhered to on the surface of the metal nanoparticle-supporting support. Subsequently, the metal oxide precursor (e.g., TEOS) is injected thereinto and then, stirred to cause a coating reaction and then, sintered, preparing a catalyst.

In this way, since the metal oxide coating layer is formed by using the surfactant, the metal oxide coating layer may include mesopores with a pore size of about 2 nm to about 50 nm. When the mesopores of the metal oxide coating layer have too large pore sizes, structural stability of a catalyst may be deteriorated, but when the mesopores have too small pore sizes, proximity of the metal nanoparticles with a reaction gas may be deteriorated.

The surfactant may be a non-ionic, cationic, or anionic surfactant in addition to cetyltrimethylammonium bromide, and types thereof are not particularly limited.

The sintering may be performed at about 400° C. to about 1000° C. for about 1 hour to about 6 hours. When the sintering is performed at less than about 400° C. or for less than about 1 hour, the surfactant may not be completely removed, but when the sintering is performed at greater than about 1000° C. for greater than about 6 hours, a specific surface area of a catalyst may be extremely reduced.

In addition, a method for preparing synthesis gas according to another embodiment may be achieved by injecting a reaction gas including water ($H_2O$) in the presence of a catalyst and heat-treating the same to perform performing a combined reforming reaction.

For example, the method of preparing synthesis gas is a method of adding carbon dioxide, a major greenhouse gas, to methane and steam, which are raw materials of conventional steam reforming and thus converting it into the synthesis gas, for example, performing the combined steam and carbon dioxide reforming of methane represented by Reaction Scheme 7 to produce the synthesis gas including carbon monoxide and hydrogen.

$$3CH_4+CO_2+2H_2O \leftrightarrow 8H_2+4CO \quad \text{[Reaction Scheme 7]}$$

A catalyst for preparing the synthesis gas may include, for example, a mesoporous $Al_2O_3$ support (mesoporous support) including mesopores, metal nanoparticles supported in the mesopores of the mesoporous $Al_2O_3$ support, and a metal oxide coating layer coated on the surface of the mesoporous $Al_2O_3$ support. This is the same as described above and thus is not repetitively described.

The reaction gas may include water, and C1 to C20 alkane, C1 to C20 alkene, C1 to C20 alkyne, carbon dioxide, ammonia, $HCO_2H$, $CH_3OH$, or a combination thereof. For example, the reaction gas may include methane and carbon dioxide and water as oxidizing agents, and in this case, the synthesis gas may include hydrogen and carbon monoxide. For example, the water may be included in the reaction gas in the form of steam.

The method of preparing synthesis gas is to supply reaction gas by adjusting a mole ratio thereof in order to obtain synthesis gas with a required composition. For example, the reaction gas may have a mole ratio of $CH_4$:$CO_2$:$H_2O$:$N_2$ of about 1:about 0.2 to about 1.2:about 1.5 to about 0.2:about 2, for example, about 1:about 0.4 to about 1:about 1 to about 0.2:about 2.

In another embodiment, in the combined reforming, the reaction gas may further include nitrogen along with methane, carbon dioxide, and water. The nitrogen may be included in a mole ratio of about 1:1 to about 1:3 relative to methane. The nitrogen may be used as a diluent to reduce a temperature fluctuation of a catalyst layer during the reaction.

The reaction gas may include methane and oxidizing agents (carbon dioxide and water) in a mole ratio of about 1:1 to about 1:3, for example about 1:1.2 to about 1:2.

When the oxidizing agents are used in a mole ratio of less than about 1, a conversion rate of methane deceases, but an amount of carbon deposition increases, which may cause inactivation of the catalyst, and when the oxidizing agents used in a mole ratio of greater than about 3, a conversion rate of carbon dioxide decreases, and an amount of hydrogen produced by oxidizing the surface of the active material of the catalyst may be reduced. The methane and carbon dioxide may have an optimal mole ratio in a range of about 1:1.2 to about 1:2, considering a conversion rate of reaction gas, a $H_2/CO$ ratio in the produced gas, and an amount of carbon deposition.

The oxidizing agents may include carbon dioxide and water in a mole ratio of about 0.2:1.5 to about 1.2:0.2. When the mole ratio of water exceeds about 1.2, inactivation of the catalyst may be promoted due to unreacted residual steam.

The reaction gas may be supplied at a space velocity of about 30 L/$g_{cat}$·h to about 1800 L/$g_{cat}$·h, for example, about 90 $g_{cat}$·h to about 1000 L/$g_{cat}$·h (based on about 50 mg of a catalyst). A feed rate of the reaction gas may be increased in proportion to a size of a combined reforming reactor and capacity of a catalyst.

A reaction temperature and a pressure of the combined reforming may be appropriately adjusted depending on a composition of synthesis gas. For example, the temperature condition of the combined reforming reaction may be about 600° C. to about 1000° C., for example, about 650° C. to about 900° C., or about 750° C. to about 850° C. When the reaction temperature is less than about 600° C., the conversion rate of carbon dioxide may greatly decrease, and $CO_2$ may be rather produced, but when the reaction temperature is greater than about 1000° C., thermal energy may be inefficiently consumed and may cause thermal inactivation of a catalyst.

In addition, the pressure condition of the combined reforming reaction may be, for example, about 0.5 atm to about 20 atm, or for example, about 1 atm to about 10 atm. When the reaction pressure is greater than about 20 atm, the conversion rate of reaction gases may be deteriorated, and the $H_2/CO$ ratio may vary.

According to the method of manufacturing synthesis gas using a catalyst, a conversion rate of methane and/or carbon dioxide relative to reaction gas may be about 30 mol % to about 95 mol %, and the method may be stable to the carbon deposition at about 800° C. up to about 100 hours.

Hereinafter, specific examples of the present disclosure are presented. However, the examples described below are only for specifically illustrating or explaining the present disclosure and the scope of the present disclosure is not limited thereto.

Preparation Example: Preparation of Catalyst

Example 1

1) Preparation of Mesoporous Support 5 g of a Pluronic P123 copolymer (MV=5800, poly (ethylene oxide)-poly(propylene oxide)-poly(ethylene oxide), hereinafter, P123, Sigma-Aldrich Co., Ltd.,) was added to 100 mL of anhydrous ethanol (99.9%, Daejung Chemicals & Metals Co., Ltd.) and then, dissolved therein through fervent stirring at room temperature for a sufficient time. When P123 was all dissolved and became a transparent solution, 8 mL of nitric acid ($HNO_3$, 70%, Junsei Chemical Co., Ltd.) was added thereto and then, additionally stirred for 1 hour. Subsequently, 10.2 g of aluminum isopropoxide (98.5%, Junsei Chemical Co., Ltd., hereinafter, AIP) as an alumina precursor was added thereto and then, stirred for 6 hours. When the stirring was completed, the mixture was dried in a 60° C. oven for 48 hours. The dried product was pulverized into powder and then, consecutively sintered at 400° C. for 1 hour (at a temperature increasing rate of 1° C./min) and at 800° C. for 2 hours (at a temperature increasing rate of 10° C./min) under an air atmosphere.

2) Supporting of Nickel Nanoparticles on Mesoporous Support

Nickel as an active material was supported on a support prepared in a dry deposition method. 10 wt % of Ni was supported on 2 g of the support prepared in the step 1 by casting a precursor solution in which 1.123 g of nickel nitrate hexahydrate ($Ni(NO_3)_2$ $6H_2O$) was dissolved in 1.5 mL of distilled water and drying it at 80° C. in a convection oven overnight. The dried mixture wad sintered under an air atmosphere at 800° C. for 2 hours (at a temperature increasing rate of 1° C./min).

3) Formation of Metal Oxide Coating Layer 1 g of the prepared catalyst was dispersed in 9 mL of ethanol through ultrasonication. 8 mL of ethanol in which 0.3 g of cetyl trimethylammonium bromide, (98%, Alfa- Aesar, hereinafter, CTAB) was dissolved and 0.6 mL of an aqueous ammonia (NH$_4$OH, 25% to 30%, Duksan Company) solution were added thereto and additionally treated with ultrasonic waves for 10 minutes, so that CTAB was attached on the surface the catalyst.

While the mixture was fervently stirred at room temperature, 0.1 mL of TEOS (98.5%, Daejung Chemicals & Metals Co., Ltd.) was injected thereinto with a syringe pump at 48 mL/h and then, stirred for 5 hours to continue a coating reaction. A product therefrom was filtered, washed with ethanol, dried at 80° C. in a convection oven overnight and then, sintered at 550° C. for 2 hours under an air atmosphere, preparing a catalyst which was called to be Ni(10)/m-Al@SiO$_2$.

Example 2

A catalyst was prepared in the same manner as Example 1 except that the amount of TEOS in the step 3 was adjusted into 0.3 mL.

Example 3

A catalyst was prepared in the same manner as Example 1 except that the amount of TEOS in the step 3 was adjusted into 0.5 mL.

Example 4

A catalyst was prepared in the same manner as Example 1 except that the amount of TEOS in the step 3 was adjusted into 1.0 mL.

Example 5

A catalyst was prepared in the same manner as Example 1 except that the amount of TEOS in the step 3 was adjusted into 1.5 mL.

Example 6

1) Preparation of Mesoporous Support 5 g of a Pluronic P123 copolymer (MV=5800, poly(ethylene oxide)-poly(propylene oxide)-poly(ethylene oxide), Sigma-Aldrich Co., Ltd., hereinafter, P123) was added to 100 mL of anhydrous ethanol (99.9%, Daejung Chemicals & Metals Co., Ltd.) and then, dissolved therein through fervent stirring at room temperature for a sufficient time. When P123 was all dissolved and became a transparent solution, and 8 mL of nitric acid (HNO$_3$, 70%, Junsei Chemical Co., Ltd.) was added thereto and then, additionally stirred for 1 hour. Subsequently, 10.2 g of aluminum isopropoxide (98.5%, Junsei Chemical Co., Ltd., hereinafter, AIP) as an alumina precursor was added thereto and then, stirred for 6 hours. When the stirring was completed, the mixture was dried in a 60° C. oven for 48 hours. The dried product was pulverized into powder and continuously sintered at 400° C. for 1 hour (at a temperature increasing rate of 1° C./min) and at 800° C. for 2 hours (at a temperature increasing rate of 10° C./min).

2) Supporting of Nickel Nanoparticles on Mesoporous Support

Nickel as an active material was supported on a support in a dry deposition method. 12 wt % of Ni was supported on 2 g of the support prepared through the step 1 by casting a precursor solution in which 1.379 g of nickel nitrate hexahydrate (Ni(NO$_3$)$_2$ 6H$_2$O) was dissolved in 1.5 mL of distilled water and drying it at 80° C. in a convention oven overnight. The dried mixture was sintered at 800° C. for 2 hours (at a temperature increasing rate of 1° C./min) under an air atmosphere.

3) Formation of Metal Oxide Coating Layer 1 g of the prepared catalyst was dispersed in 9 mL of ethanol through ultrasonication. 8 mL of ethanol in which 0.3 g of cetyl trimethylammonium bromide (98%, Alfa-Aesar, hereinafter, CTAB) was dissolved and 0.6 mL of an aqueous ammonia (NH$_4$OH, Duksan Company, 25% to 30%) solution were added thereto and then, additionally, treated with ultrasonic waves for 10 minutes and stirred for 30 minutes, so that CTAB was attached onto the surface of the catalyst.

0.01 g of AIP was added thereto and then, stirred for 5 hours to continuously performing a coating reaction. A product therefrom was filtered, washed with ethanol, dried at 80° C. in a convection oven overnight and sintered at 550° C. for 2 hours (at 1° C./min) under an air atmosphere, preparing a catalyst, which was called to be Ni(12)/m-Al@Al$_2$O$_3$.

Example 7

A catalyst was prepared in the same manner as Example 6 except that the amount of AIP in the step 3 was adjusted into 0.09 g.

Example 8

A catalyst was prepared in the same manner as Example 6 except that the amount of AIP in the step 3 was adjusted into 0.27 g.

Example 9

A catalyst was prepared in the same manner as Example 6 except that the amount of AIP in the step 3 was adjusted into 1.37 g.

Comparative Example 1

A supported catalyst was prepared in the same manner as Example 1 except that the additional metal oxide coating layer (step 3) was not introduced. The prepared catalyst was called to be Ni(10)/m-Al.

Comparative Example 2

A supported catalyst was prepared in the same manner as Example 6 except that the additional metal oxide coating layer (Step 3) was not introduced. The prepared catalyst was called to be Ni(12)/m-Al.

Comparative Example 3

A catalyst, which was called to be Ni(10)/Al$_2$O$_3$, was prepared in the same manner as the step 2 of Example 1 except that the amount of Ni became 10 wt % by using commercial alumina (specific surface area=114 m$^2$/g) as a support in a general dry supported method.

Comparative Example 4

A catalyst, which was called to be Ni(12)/Al$_2$O$_3$, was prepared in the same manner as the step 2 of Example 6 except that the amount of Ni became 12 wt % by using commercial alumina (specific surface area=150 m²/g) as a support in a general dry supported method.

Comparative Example 5

A catalyst, which was called to be $Ni(12)/Al_2O_3@Al_2O_3$, was prepared in the same manner as the step 3 of Example 7 except that the $Ni(12)/Al_2O_3$ catalyst of Comparative Example 4 was used.

Comparative Example 6

A commercially available nickel-based catalyst for steam reforming (specific surface area=12.3 m²/g) was used.

EXPERIMENTAL METHODS

Experimental Example 1

Analysis of Physical Properties of Catalyst 1

Each catalyst was checked with respect to a composition by performing an X-ray fluorescence analysis (XRF, S8 Tiger) to measure an amount of each oxide, and the results are shown in Table 1.

Experimental Example 2

Analysis of Physical Properties of Catalyst 2

The catalysts were analyzed with respect to a specific surface area, an average pore diameter, and a pore volume through a surface structure analysis by using Tristar 3020. In order to remove moisture and surface adsorbents, after heat-treating the catalysts in a vacuum state at 90° C. for 1 hour and continuously, at 350° C. for 4 hours and then, measured with respect to an amount of nitrogen, while the nitrogen was adsorbed and desorbed at −196° C., to obtain specific surface areas and physical values of pores of the catalysts, and the results are shown in Table 1.

Experimental Example 3

Analysis of Physical Properties of Catalyst 3

The catalysts were analyzed with respect to a crystal phase and an average crystal size by measuring a metal crystal size with an X'Pert PRO Multi Purpose X-ray diffractometer. Before the analysis, the catalysts were reduced by increasing a temperature of 5 vol % $H_2/N_2$ gas to 800° C. at 30 mL/min for 1 hour and maintaining the temperature for 3 hours temperature. The reduced catalysts were analyzed with respect to a metal nickel crystal size, and the results is shown in Table 1.

Experimental Example 4

Activity Test of Catalyst for Preparing Synthesis Gas Through Combined Reforming A combined reforming experiment was performed by using carbon dioxide, methane, and steam in a ⅜ in. Inconel fixed bed reactor. 50 mg of each catalyst was charged in the reactor and then, reduced by heating 5 vol % $H_2/N_2$ gas at 30 mL/min to 800° C. for 1 hour and maintaining the temperature for 3 hours before a reaction. After cooling the reactor to 750° C., the reaction was performed by injecting a reaction gas of $CH_4:CO_2:H_2O:N_2$ (internal standard material)=1:0.4:0.8:2 under a normal pressure at space velocity SV=180 $L/g_{cat}·h$. The reaction was continuously performed for about 20 hours, and $CO_2$ and $CH_4$ conversion rates and an inactivation rate (a decrease in a methane conversion rate during reaction time) were measured and then, shown in Table 2.

Experimental Example 5

Activity Test of Catalyst for Preparing Synthesis Gas Through Combined Reforming An activity test was performed in the same manner as in Experimental Example 4 except that the reaction was performed by changing the reaction temperature into 700° C. to 800° C. and the space velocity into 120 $L/g_{cat}·h$ to 360 $L/g_{cat}·h$. The reaction was continuously performed for about 15 hours to 20 hours, and when the $CO_2$ and $CH_4$ conversion rates and the inactivation rate (a decrease in the methane conversion rate during the reaction time) were measured, and the results are shown in Tables 3 and 4.

Experimental Example 6

Operation Range Test of Catalyst for Preparing Synthesis Gas Through Combined Reforming An activity test was performed in the same manner as Experimental Example 4, but a catalyst layer was filled by mixing 10 mg of a catalyst and 190 mg of silicon carbide (SiC, SICAT) in order to minimize a heat transfer limit of the catalyst layer at a high flow rate. The catalysts were checked with respect to an operation range by changing the reaction temperature to 600° C. to 900° C., the space velocity to SV=1,500 $L/g_{cat}·h$, and the oxidizing agent ratio to $CO_2/H_2O$=0.4/0.8 to 0.8/0.4. An average of $CO_2$ and $CH_4$ conversion rates for each reaction condition is shown in Table 5 and FIG. 3.

Experimental Example 7

Catalyst State (STEM-EDS) Before and After Preparation of Synthesis Gas

Figure 4:
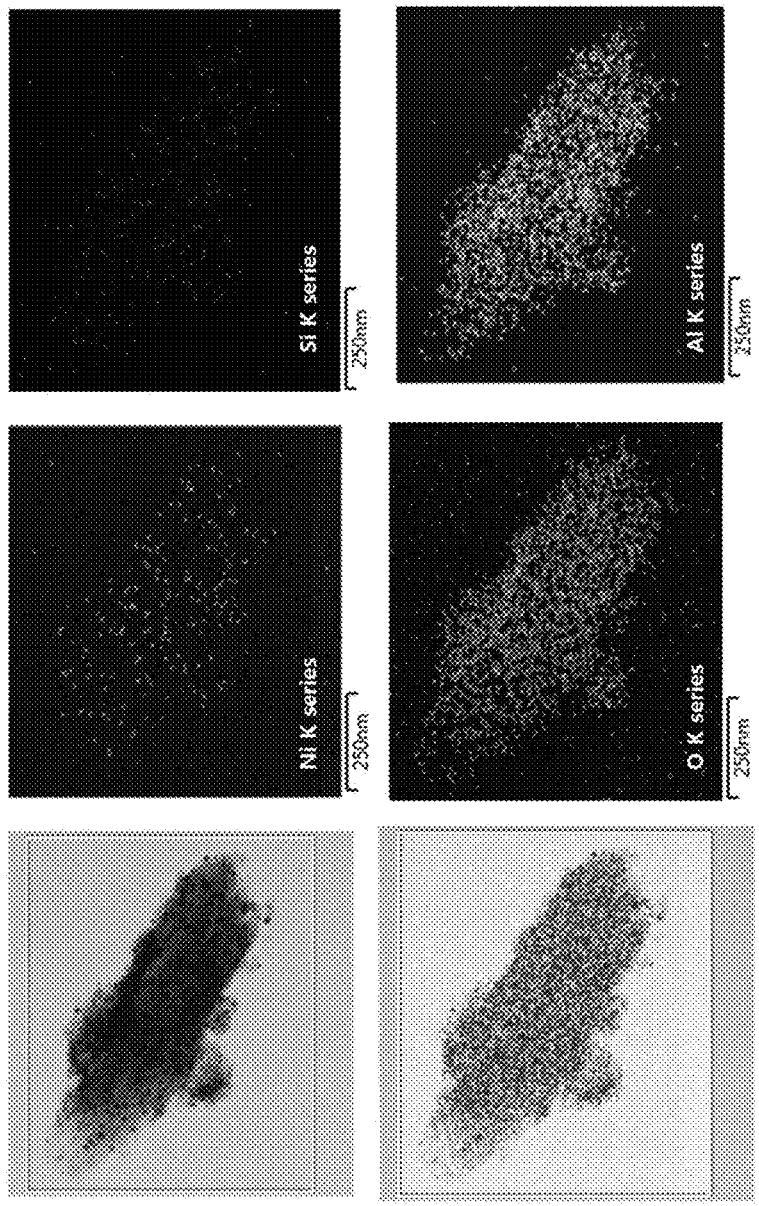
FIG. 4 shows an image after reduction of the catalyst prepared in Example 2.

Catalyst states before and after preparation of synthesis gas were examined by using a scanning transmission electron microscope with energy dispersive spectroscopy (STEM-EDS). FIG. 4 shows an image of the catalyst of Example 2 after the reduction.

Experimental Example 8

Catalyst State (TEM) Before and After Preparation of Synthesis Gas

Figure 5:
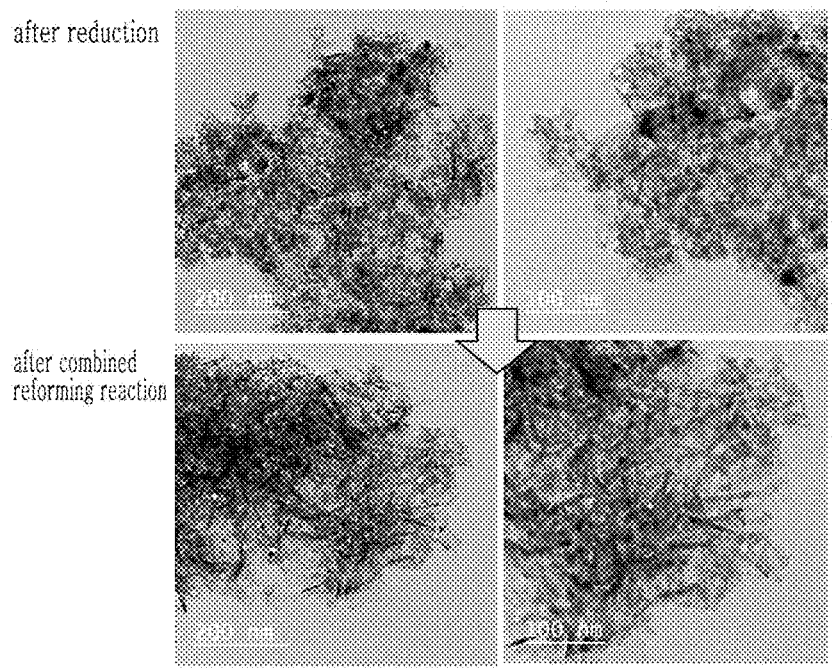
FIGS. 5 and 6 show images after reduction and combined reforming reaction of the catalysts prepared in Comparative Examples 3 and 7, respectively.
Figure 6:
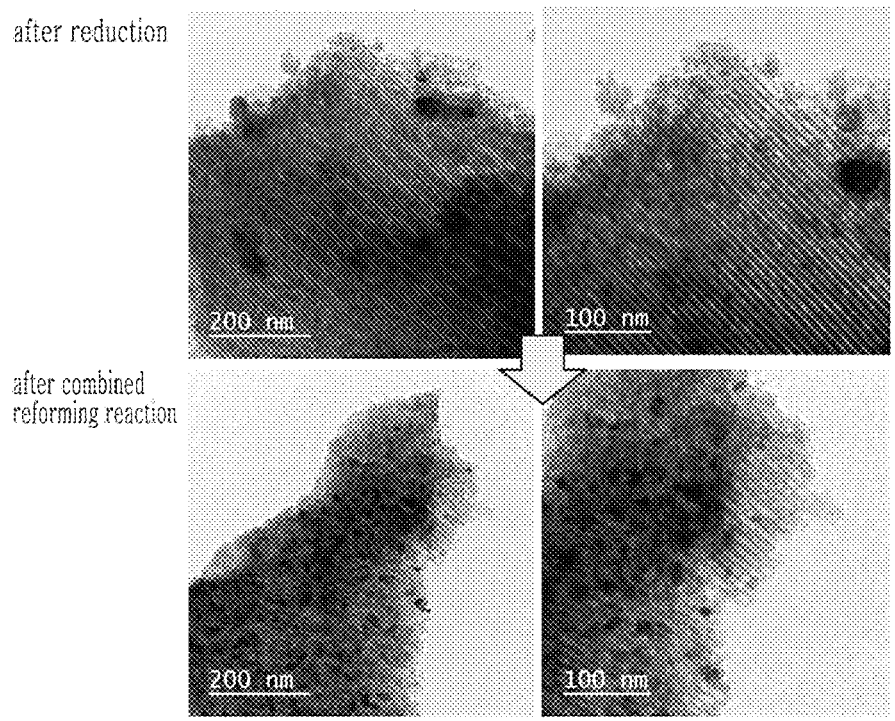

Catalyst states before and after preparation of synthesis gas were examined with a transmission electron microscope (TEM). FIGS. 5 and 6 show each image of the catalysts of Comparative Example 3 and Example 7 after the reduction and the combined reforming reaction.

[Experiment Results]

Table 1 provides chemical compositions of the catalysts of the comparative examples and the examples, which were obtained through the X-ray fluorescent analysis of Experimental Example 1, and surface characteristics of the catalysts of the comparative examples and the examples, which were obtained through the nitrogen adsorption/desorption analysis of Experimental Example 2.

TABLE 1

| | Experimental Example 1. | | | Experimental Example 1, Nitrogen adsorption and desorption analysis | | | Experimental Example 3, X-ray diffraction pattern analysis |
|---|---|---|---|---|---|---|---|
| | | XRF (wt %) | | Specific | Pore | Pore | Nickel crystal |
| | | NiO | $Al_2O_3$ | Coating material ($SiO_2$/$Al_2O_3$) | surface area ($m^2$/g) | diameter (nm) | volume ($cm^3$/g) | size (nm) |

| | | NiO | $Al_2O_3$ | Coating material | Specific surface area ($m^2$/g) | Pore diameter (nm) | Pore volume ($cm^3$/g) | Nickel crystal size (nm) |
|---|---|---|---|---|---|---|---|---|
| Ex. 1 | $SiO_2$ | 10.0 | 88.2 | 1.8 | 149 | 7.1 | 0.35 | — |
| Ex. 2 | coating | 10.4 | 86.0 | 3.6 | 137 | 7.1 | 0.33 | — |
| Ex. 3 | | 10.6 | 85.3 | 4.1 | 150 | 7.1 | 0.35 | — |
| Ex. 4 | | 9.7 | 82.3 | 8.0 | 164 | 6.0 | 0.31 | — |
| Ex. 5 | | 10.5 | 81.1 | 8.4 | 158 | 5.2 | 0.24 | — |
| Ex. 6 | $Al_2O_3$ | 13.2 | 86.8 | 3.4 | 194 | 6.2 | 0.40 | 10.5 |
| Ex. 7 | coating | 12.8 | 87.2 | 3.8 | 173 | 6.4 | 0.37 | 8.7 |
| Ex. 8 | | 12.2 | 87.8 | 4.4 | 168 | 6.5 | 0.37 | 12.8 |
| Ex. 9 | | 9.3 | 90.7 | 7.3 | 206 | 6.0 | 0.41 | 14.3 |
| Comp. Ex. 5 | | 13.2 | 86.8 | | 122 | 12.0 | 0.43 | — |
| Comp. Ex. 1 | None coating | 11.1 | 88.9 | — | 168 | 7.1 | 0.39 | — |
| Comp. Ex. 2 | | 16.6 | 83.4 | — | 145 | 6.1 | 0.33 | 14.2 |
| Comp. Ex. 3 | | 9.8 | 90.2 | — | 108 | 10 | 0.37 | — |
| Comp. Ex. 4 | | 17.1 | 82.9 | — | 113 | 13.6 | 0.46 | — |

Referring to Table 1, the examples (coating catalysts) exhibited that a supported amount of nickel oxide (NiO) decreased according to a coating amount after the coating decreased, compared with Comparative Examples 1 and 2 (mother catalysts). As for the silica coating (Examples 1 to 5), additional silica coating took about 2 wt % to 8 wt % out of a total weight of each catalyst, and as for the alumina coating (Examples 6 to 9), when estimated by a decreased amount (16.6 wt %) of nickel oxide of the mother catalyst of Comparative Example 2, additional alumina coating took about 3 wt % to 7 wt % based on the total weight of the catalyst.

The silica-coated catalysts of Examples 1 and 5 exhibited a slightly reduced but generally equivalent specific surface area after the additional coating, compared with the mother catalyst of Comparative Example 1, wherein as TEOS was increasingly more added, a decreased average pore diameter from 7.1 nm of Comparative Example 1 to 5.2 nm (Example 5) at minimum, a decreased pore volume from 0.39 $cm^3$/g of Comparative Example 1 to 0.24 $cm^3$/g of Example 5, which shows that silica was in general deposited on the inner walls of the pores. The alumina-coated catalysts of Examples 6 to 9 exhibited no consistent change depending on an amount of AIP added during the additional coating, compared with the mother catalyst of Comparative Example 2, but had a specific surface area of about 160 $m^2$/g to 200 $m^2$/g, a pore volume of 0.37 $cm^3$/g to 0.41 $cm^3$/g, which were all increased from a specific surface area of 145 $m^2$/g and a pore volume of 0.33 $cm^3$/g of the mother catalyst, and accordingly, the alumina coating material had different surface characteristics from those of the mother catalyst and the silica coating material.

The alumina-coated catalysts according to Examples 6 and 9 had a substantially reduced nickel crystal size after the additional coating, compared with the mother catalyst of Comparative Example 2. Particularly, the catalysts of Examples 6 to 8 using a small amount of the alumina coating material had a size of 8.7 nm to 12.8 nm, which were smaller than 14.2 nm of the mother catalyst.

Table 2 shows the performance of the catalysts through the catalyst activity test in Experimental Example 4.

TABLE 2

| | | Methane conversion rate (%) | | Carbon dioxide conversion rate (%) | | |
|---|---|---|---|---|---|---|
| | | Initial | After 20 hours | Initial | After 20 hours | Inactivation rate ($CH_4$ %/20 h) |
| Example 1 | $SiO_2$ | 88.5 | 86.3 | 45.0 | 44.9 | −2.2 |
| Example 2 | coating | 88.9 | 89.0 | 49.9 | 44.2 | +0.1 |
| Example 3 | | 87.8 | 85.6 | 48.4 | 45.1 | −2.2 |
| Example 4 | | 79.3 | 79.0 | 38.6 | 38.2 | −0.3 |
| Example 5 | | 69.9 | 71.1 | 31.1 | 31.5 | +1.2 |
| Example 8 | $Al_2O_3$ | 88.7 | 89.0 | 45.7 | 48.7 | +0.3 |
| Example 10 | coating | 88.2 | 88.5 | 44.3 | 40.2 | +0.3 |
| Comparative Example 1 | None coating | 69.7 | 66.1 | 27.7 | 26.5 | −3.6 |
| Comparative Example 3 | | 77.4 | 74.1 | 31.8 | 32.3 | −3.1 |
| Comparative Example 6 | | 88.2 | 76.2 | 55.2 | 46.1 | −12.0 |

Referring to Table 2, the silica-coated mother catalyst of Comparative Example 1 exhibited a lower methane conversion rate of 66.1% than 74.1% of the catalyst of Comparative Example 3 using a commercially available support based on a methane conversion rate after 20 hours' reaction.

The silica-coated catalysts of Examples 1 to 5 exhibited a similar or higher methane conversion rate (71.1% to 89.0%) than that of the mother catalyst of Comparative Example 1, which exhibited that a certain amount of silica coating had an effect of enhancing performance of the catalysts. The silica-coated catalysts of Examples 1 to 4 exhibited higher performance than the catalyst of Comparative Example 3 including a similar amount of nickel oxide and using a commercially available support, which shows that an appropriate amount of the silica coating has an effect of enhancing the performance of the catalysts. The partially alumina-coated catalysts of Examples 8 and 10 exhibited a high initial conversion rate of about 89%, and accordingly, the alumina coating had an effect of increasing the catalyst performance. A commercial catalyst for steam reforming of Comparative Example 6 exhibited an overall lower conversion rate than 76.2% of the coated catalysts after 20 hours of reaction.

In addition, based on a 20-hour inactivation rate, general supported catalysts of Comparative Examples 1 and 3 exhibited a significant inactivation rate of about −3%, the commercially-available catalyst for steam reforming of Comparative Example 6 exhibited a large inactivation rate of −12%, but the coated catalysts of the examples exhibited an inactivation rate of −2.2% at maximum, which shows that the silica and alumina coating had an effect of increasing stability of the catalysts.

Table 3 shows the performance of the catalysts through the catalyst activity test in Experimental Example 5.

Referring to Table 4, performance of the catalyst was confirmed according to a pore distribution range and depending on coating or not under the reaction conditions of Experimental Example 4 such as a low reaction temperature of 700° C. and space velocity of 120 L/$g_{cat}$·h. As confirmed in FIG. 2, since the supported catalyst of Comparative Example 2 using a mesoporous alumina support having a pore range of 2 nm to 30 nm exhibited an initial methane conversion rate of 83.8% and a last methane conversion rate of 81.0%, but the alumina-coated catalyst of Example 7 exhibited each conversion rate of 86.6% and 84.3% under the same reaction conditions, performance was not only improved after the coating, but also a decrease in the methane conversion rate for 15 hours was −2.3%, which was larger than −2.8% of the catalyst of Comparative Example 2, and thus also showed improved stability. The supported

TABLE 3

| | Space velocity (L/$g_{cat}$ · h) | Methane conversion rate (%) | | Carbon dioxide conversion rate (%) | | Inactivation rate (CH$_4$ %/20 h) |
|---|---|---|---|---|---|---|
| | | Initial | After 20 hours | Initial | After 20 hours | |
| Example 7 | 300 | 96.9 | 93.5 | 68.5 | 60.5 | −3.4 |
| | 360 | 96.7 | 94.9 | 54.8 | 56.1 | −1.8 |
| Comparative Example 2 | 360 | 95.9 | 85.9 | 54.4 | 43.7 | −10.0 |
| Comparative Example 3 | 300 | 93.5 | 84.1 | 59.3 | 48.8 | −9.4 |

Figure 2:
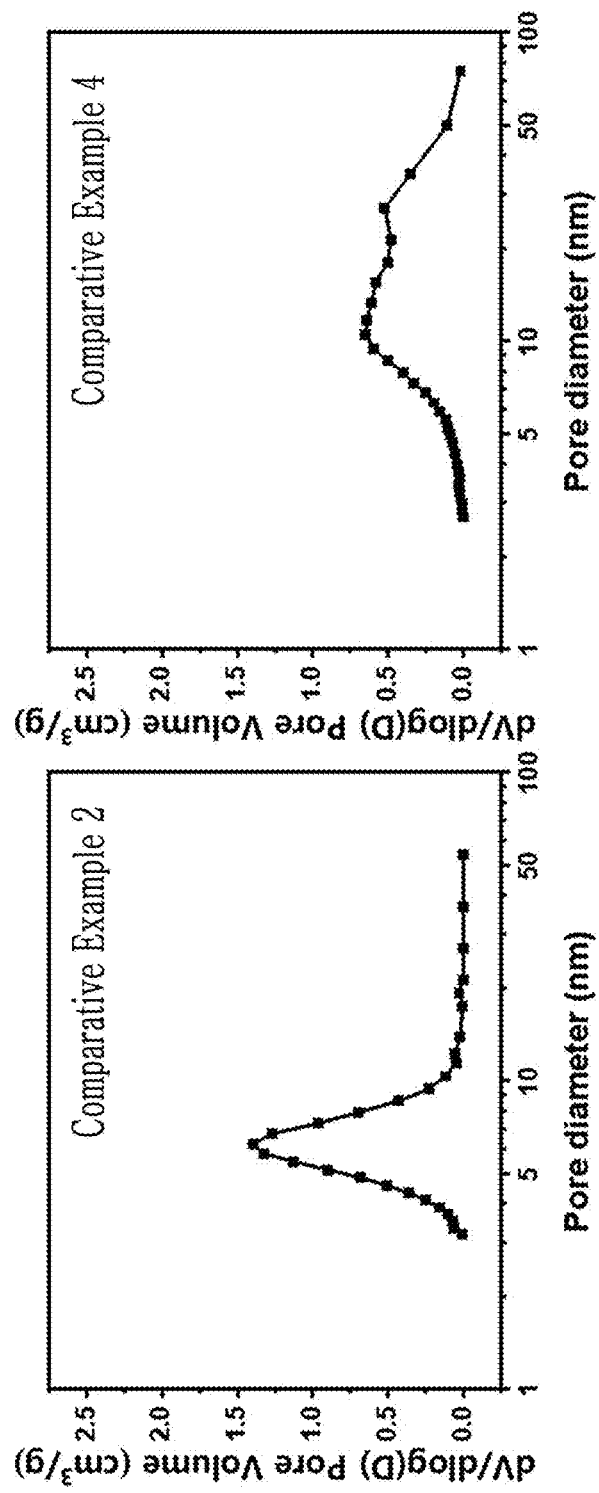
FIG. 2 is a graph showing a pore size distribution of the catalyst measured in Experimental Example 2.

Referring to Table 3, the performance of the catalyst was confirmed at a reaction temperature of 800° C. and relatively high space velocity of 300 L/$g_{cat}$·h to 360 L/$g_{cat}$·h which also confirmed that an initial methane conversion rate of the catalyst was at least 93.5% or more under the corresponding conditions of Experimental Example 4. The alumina-coated catalyst of Example 7 exhibited an initial methane conversion rate of 96.9% and a last methane conversion rate of 93.5% at space velocity of 300 L/$g_{cat}$·h, but the catalyst of Comparative Example 3 using a commercially available support exhibited the conversion rates of 93.5% and 84.1% under the same reaction condition, of which a methane conversion rate decreased by −9.4% for 20 hours, which was much larger than −3.4% of the coated catalyst. When an activity test was conducted at space velocity of 360 L/$g_{cat}$·h, the alumina-coated catalyst of Example 7 exhibited initial and last methane conversion rates of 96.7% and 94.9%, but the catalyst of Comparative Example 2, which is a mother catalyst thereof, exhibited initial and last methane conversion rates of 95.9% and 85.9% and thus similar initial activity but a decreased methane conversion rate of −10.0% for 20 hours, which is clearly larger than −1.8% of the coated catalyst, and accordingly, the alumina coating brought about higher catalyst activity and stability than general supported catalysts, although a content of nickel was reduced.

catalyst of Comparative Example 4 using a commercially available alumina support with a pore distribution range of 2 nm to 100 nm exhibited initial and last methane conversion rates of 79.3% and 76.2%, and the catalyst of Comparative Example 5 obtained by coating on this exhibited initial and last methane conversion rates of 78.9% and 75.9% but insufficient performance, compared with the catalysts of Comparative Example 2 and Example 7 using a mesoporous alumina support with a pore distribution range of 2 nm to 50 nm, and in particular, Comparative Example 5, in which the coating was performed, exhibited no improved performance, compared with the mother catalyst of Comparative Example 4. Table 5 and FIG. 2 shows performance results of the alumina-coated catalyst of Example 7 depending on a temperature, space velocity, and a composition through the catalyst operation range test of Experimental Example 6.

TABLE 4

| | Pore distribution range | Methane conversion rate (%) | | Carbon dioxide conversion rate (%) | | Inactivation rate (CH$_4$ %/15 h) |
|---|---|---|---|---|---|---|
| | | Initial | After 15 hours | Initial | After 15 hours | |
| Comparative Example 2 | 2 to 30 nm | 83.8 | 81.0 | 29.3 | 22.7 | −2.8 |
| Example 7 | | 86.6 | 84.3 | 31.8 | 25.9 | −2.3 |
| Comparative Example 4 | 2 to 100 nm | 79.3 | 76.2 | 19.2 | 16.3 | −3.1 |
| Comparative Example 5 | | 78.9 | 75.9 | 29.4 | 14.9 | −3.0 |

TABLE 5

| | Methane conversion rate (%) | Carbon dioxide conversion rate (%) | Note |
|---|---|---|---|
| Reaction temperature (° C.) | | | |
| 900 | 99.7 | 58.8 | Example 7 catalyst |
| 800 | 97.5 | 54.1 | space velocity: 90 L/$g_{cat}$·h |
| 700 | 86.3 | 34.9 | $CH_4:CO_2:H_2O$ = 1:0.4:0.8 |
| 600 | 55.4 | −9.7 | |
| Space velocity (L/$g_{cat}$·h) | | | |
| 1200 | 88.3 | 43.5 | Example 7 catalyst |
| 1500 | 78.5 | 35.2 | reaction temperature: 800° C. |
| 1800 | 67.3 | 21.9 | $CH_4:CO_2:H_2O$ = 1:0.4:0.8 |
| $CH_4:CO_2:H_2O$ | | | |
| 1:0.4:0.8 | 94.0 | 54.1 | Example 7 catalyst |
| 1:0.6:0.6 | 90.8 | 68.6 | space velocity: 1000 L/$g_{cat}$·h |
| 1:0.8:0.4 | 90.8 | 62.4 | reaction temperature: 800° C. |

Figure 3:
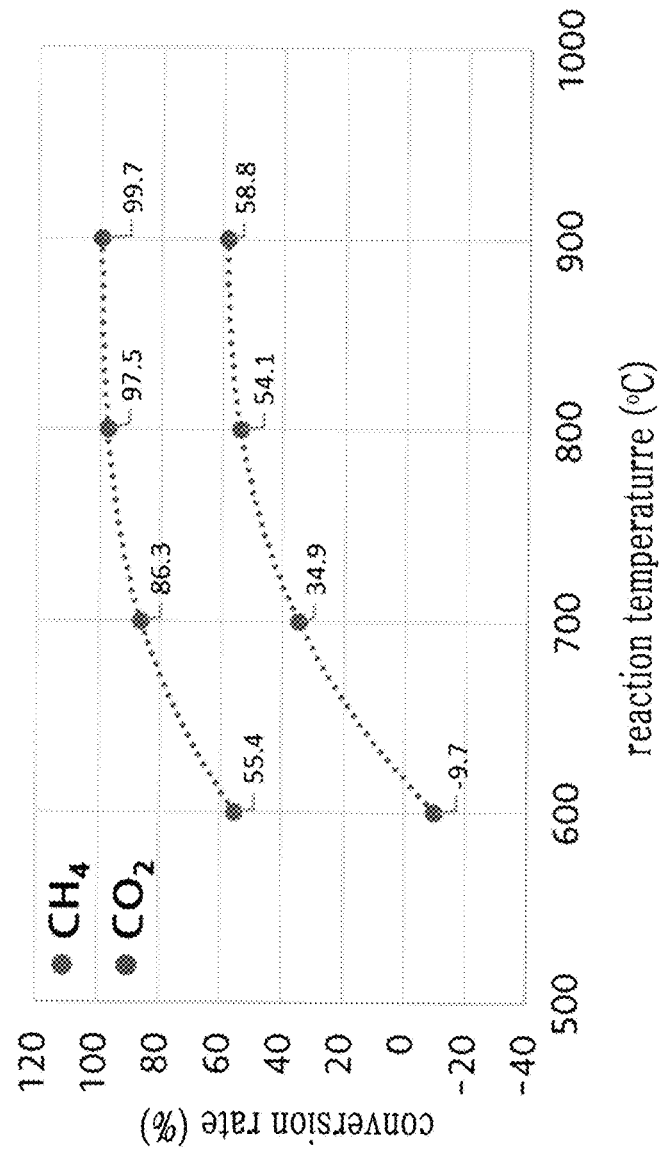
FIG. 3 is a graph showing a conversion rate according to the reaction temperature of the catalyst measured in Experimental Example 6.

Referring to Table 5 and FIG. 3, regarding influences of a reaction temperature on performance of a catalyst, the alumina-coated catalyst of Example 7 had methane and carbon dioxide conversion activity near to an equilibrium conversion rate from 900° C. to 700° C. but a dominant SMR reaction at 600° C. and rather generated $CO_2$ and as shown in FIG. 1, exhibited a data trend of the dominant SMR at 620° C. or lower and thus turned out not to be appropriate for the present reaction due to the generation of $CO_2$.

An excellent conversion rate of 88.3% with reference to a methane conversion rate was obtained at space velocity of 1200 L/$g_{cat}$·h, but as a flow rate increased, when the space velocity reached 1500 L/$g_{cat}$·h and 1800 L/$g_{cat}$·h, the conversion rate decreased to 78.5% and 67.3%, which were not suitable. When examined by changing a ratio of oxidizing agents at a reaction temperature of 800° C. and space velocity of 1000 L/$g_{cat}$·h, the catalyst of Example 7 exhibited a methane conversion rate of 90% or more and thus excellent performance of 90% or more, compared with an equilibrium conversion rate under the corresponding conditions. When the reaction was performed under a condition of $CH_4:CO_2:H_2O$=1:0.4:0.8, the catalyst exhibited a methane conversion rate of 94.0% on average and had high activity near to an equilibrium conversion rate under the corresponding conditions. Accordingly, when the reaction was performed at a lower space velocity which was less severe than the above, activity near to the equilibrium conversion rate would be expected. When the ratio of oxidizing agents was set to increase a ratio of carbon dioxide to steam $CO_2$:$H_2O$=0.6:0.6 at the same space velocity, a methane conversion rate was partially decreased to 90.8%, but as an amount of carbon dioxide participating in the reaction increased, a conversion rate and a conversion amount of carbon dioxide increased. When the ratio of oxidizing agents was set to much increase the ratio of carbon dioxide to steam $CO_2$:$H_2O$=0.8:0.4, the methane conversion rate was maintained at 90.8%, but as the amount of carbon dioxide increased, the conversion amount of the carbon dioxide increased, but the conversion rate thereof decreased, compared with the case of $CO_2$:$H_2O$=0.6:0.6.

FIG. 4 shows an image after reduction of the catalyst prepared in Example 2.

Referring to FIG. 4, when the Ni(10)/m-Al@$SiO_2$-coated catalyst of Example 2 was reduced at 800° C. under a hydrogen atmosphere and imaged with respect to a microstructure and a composition distribution through STEM-EDS, nickel of an active material and additional $SiO_2$ coating were evenly distributed on an $Al_2O_3$ support in the image.

FIGS. 5 and 6 show images after reduction and combined reforming reaction of the catalysts prepared in Comparative Examples 3 and 7, respectively. In FIG. 4 and FIG. 5, the left image had a scale of 200 nm, while the right image had a scale of 100 nm, and the top image shows after the reduction, while the bottom image shows after the reaction.

Referring to FIGS. 5 and 6, when TEM images of the alumina-coated catalyst of Example 7 and Ni(10)/$Al_2O_3$ of Comparative Example 3 prepared by using a commercially available support after the reduction and the reaction were examined, nickel particles in the coated-catalyst was suppressed from aggregation but dispersed in a uniform size.

Embodiments provide a catalyst for a synthesis gas manufacturing process through a combined reforming reaction of methane and carbon dioxide by coating a nickel-based supported catalyst using $Al_2O_3$ as a support and coated with an appropriate amount of $SiO_2$ and $Al_2O_3$ inorganic oxides as a coating material and a method for preparing the same. This catalyst turned out to be superior to a simply supported catalyst and a conventional commercial catalyst in a combined reforming reaction for preparing a synthesis gas and also, used under a wider range of reaction conditions. The result seemed to be obtained by preventing oxidation and aggregation of the active nickel particles and thus improving hydrothermal stability, and the aforementioned additional inorganic coating improved inactivation of the catalyst by thermal and hydrothermal reactions and secured performance of the catalyst and thus was expected to be applied to a catalyst used for high-temperature reactions and other reactions involving steam as well as reforming reactions.

While this present disclosure has been described in connection with what is presently considered to be practical example embodiments, it is to be understood that the present disclosure is not limited to the disclosed embodiments. On the contrary, it is intended to cover various modifications and equivalent arrangements included within the spirit and scope of the present disclosure.

DESCRIPTION OF SYMBOLS

10: mesoporous $Al_2O_3$ support
20: metal nanoparticles
30: metal oxide coating layer

What is claimed is:

1. A catalyst for preparing a synthesis gas, the catalyst comprising:
   a mesoporous $Al_2O_3$ support including mesopores having a pore size of about 1 nm to about 30 nm,
   metal nanoparticles supported in the mesopores of the mesoporous $Al_2O_3$ support wherein the metal nanoparticles have a particle size of less than or equal to about 20 nm, and
   a metal oxide coating layer including particles wherein the metal oxide coating layer is coated on a surface of the mesoporous $Al_2O_3$ support and includes mesopores having a pore size of about 2 nm to about 50 nm.

2. The catalyst of claim 1, wherein the pore size of the mesoporous $Al_2O_3$ support is about 6 nm to about 20 nm.

3. The catalyst of claim 1, wherein the metal nanoparticles comprise Ni, Fe, Cu, Co, Mo, Ru, Rh, Pd, Ag, Cd, Zn, Au, Pt, Ir, Os, W, an oxide thereof, or a combination thereof.

4. The catalyst of claim 1, wherein the particle size of the metal nanoparticles is about 1 nm to about 6 nm.

5. The catalyst of claim 1, wherein the metal nanoparticles are included in an amount of about 5 wt % to about 30 wt % based on a total weight of the catalyst.

6. The catalyst of claim 1, wherein the metal oxide coating layer comprises $SiO_2$, $Al_2O_3$, MgO, $MgAl_2O_4$, $La_2O_3$, $CeO_2$, $ZrO_2$, SiC, indium tin oxide (ITO), fluorine-doped tin oxide (FTO), or a combination thereof.

7. The catalyst of claim 1, wherein the metal nanoparticles are disposed in an amount of about 10 wt % to about 90 wt % based on a total weight of the metal nanoparticles in the mesopores of the mesoporous $Al_2O_3$ support.

8. The catalyst of claim 1, wherein the metal oxide coating layer is included in an amount of about 0.5 wt % to about 10 wt % based on a total weight of the catalyst.

9. A method of preparing a catalyst for preparing a synthesis gas, the method comprising:
preparing a mesoporous $Al_2O_3$ support including mesopores having a pore size of about 1 nm to about 30 nm;
supporting metal nanoparticles having a particle size of less than or equal to about 20 nm in the mesopores of the mesoporous $Al_2O_3$ support; and
forming a metal oxide coating layer including mesopores having a pore size of about 2 nm to about 50 nm on a surface of the mesoporous $Al_2O_3$ support.

10. The method of claim 9, wherein
the supporting of the metal nanoparticles is performed by
applying a metal nanoparticle precursor solution to the mesoporous $Al_2O_3$ support and then sintering the same at about 400° C. to about 1000° C. for about 1 hour to about 6 hours.

11. The method of claim 9, wherein
the forming of the metal oxide coating layer is performed by
attaching a nonionic, cationic, or anionic surfactant to the surface of the mesoporous $Al_2O_3$ support on which the metal nanoparticles are supported, applying the metal oxide precursor solution, and sintering the same at about 400° C. to about 1000° C. for about 1 hour to about 6 hours to form the metal oxide coating layer including mesopores having a pore size of about 2 nm to about 50 nm.

12. The method of claim 9, wherein the metal nanoparticles are disposed in an amount of about 10 wt % to about 90 wt % based on a total weight of the metal nanoparticles in the mesopores of the mesoporous $Al_2O_3$ support.

13. A method of preparing a synthesis gas, comprising
performing a combined reforming reaction by injecting a reaction gas including water ($H_2O$) in the presence of the catalyst for preparing a synthesis gas according to claim 1, and
heat-treating the same to perform a combined reforming reaction.

14. The method of claim 13, wherein the reaction gas comprises water, and C1 to C20 alkane, C1 to C20 alkene, C1 to C20 alkyne, carbon dioxide, ammonia, $HCO_2H$, $CH_3OH$, or a combination thereof.

15. The method of claim 13, wherein
the reaction gas comprises methane, carbon dioxide as an oxidizing agent, and the water, and
the synthesis gas comprises hydrogen and carbon monoxide.

16. The method of claim 15, wherein the reaction gas comprises the methane and the oxidizing agent (carbon dioxide and water) in a mole ratio of about 1:1 to about 1:3.

17. The method of claim 15, wherein the oxidizing agents comprise the carbon dioxide and water in a mole ratio of about 0.2:1.5 to about 1.2:0.2.

18. The method of claim 13, wherein the combined reforming reaction is performed at a temperature of about 600° C. to about 1000° C.

19. The method of claim 13, wherein the reaction gas is supplied at a space velocity of about 30 $L/g_{cat}\cdot h$ to about 1800 $L/g_{cat}\cdot h$.

* * * * *